United States Patent
Kaji et al.

[11] Patent Number: 5,505,765
[45] Date of Patent: Apr. 9, 1996

[54] METHOD AND APPARATUS FOR SEPARATING NITROGEN-ENRICHED GAS

[75] Inventors: Shinichi Kaji; Kazuo Haruna, both of Hyogo, Japan

[73] Assignee: Sumitomo Seika Chemicals Co., Ltd., Hyogo, Japan

[21] Appl. No.: 403,777

[22] Filed: Mar. 24, 1995

[30] Foreign Application Priority Data

Jul. 27, 1993 [JP] Japan .................................. 5-184975
Oct. 22, 1993 [JP] Japan .................................. 5-265259

[51] Int. Cl.$^6$ .............................................. B01D 53/053
[52] U.S. Cl. ..................... 95/100; 95/103; 95/105; 95/138; 96/130; 96/133
[58] Field of Search ................... 95/96–98, 100, 95/103–105, 138; 96/121, 122, 124, 130, 133

[56] References Cited

U.S. PATENT DOCUMENTS

| | | | |
|---|---|---|---|
| 3,080,693 | 3/1963 | Glass et al. | 96/130 X |
| 3,399,510 | 9/1968 | Kauer, Jr. et al. | 95/98 |
| 3,430,418 | 3/1969 | Wagner | 95/100 |
| 3,564,816 | 2/1971 | Batta | 95/100 |
| 3,636,679 | 1/1972 | Batta | 95/100 |
| 3,738,087 | 6/1973 | McCombs | 95/98 |
| 3,891,411 | 6/1975 | Meyer | 96/130 X |
| 4,440,548 | 4/1984 | Hill | 95/138 X |
| 4,494,966 | 1/1985 | Umeki | 95/138 X |
| 4,572,723 | 2/1986 | Ward | 95/138 X |
| 4,725,293 | 2/1988 | Gunderson | 96/130 X |
| 4,925,461 | 5/1990 | Gemba et al. | 95/138 X |
| 5,015,271 | 5/1991 | Reiss | 95/138 X |
| 5,122,164 | 6/1992 | Hirooka et al. | 96/130 X |
| 5,176,722 | 1/1993 | Lemcoff et al. | 95/138 X |
| 5,346,536 | 9/1994 | Kaneshige et al. | 95/138 X |
| 5,441,558 | 8/1995 | Lee et al. | 95/138 X |

FOREIGN PATENT DOCUMENTS

| | | | |
|---|---|---|---|
| 60-110318 | 6/1985 | Japan . | |
| 1-41085 | 9/1989 | Japan . | |
| 2-026609 | 1/1990 | Japan | 95/138 |
| 2-030607 | 2/1990 | Japan | 95/138 |
| 2-56126 | 11/1990 | Japan . | |
| 3-77617 | 4/1991 | Japan . | |
| 5-32087 | 5/1993 | Japan . | |

Primary Examiner—Robert Spitzer
Attorney, Agent, or Firm—Michael D. Bednarek; Marks & Murase

[57] ABSTRACT

A method of separating nitrogen-enriched gas is performed by PSA with the use of an apparatus which comprises a plurality of adsorbers (1, 2), a balance tank (3), and a product receiver (4). The method is characterized by comprising the steps of (a) passing, at a predetermined flow rate, high-purity nitrogen gas from the balance tank (3) to an outlet of an adsorber (2) undergoing regeneration; (b) establishing communication between the outlets of both adsorbers (1, 2) through a pressure equalization line while opening the inlets of both adsorbers to atmospheric pressure; (c) after the above step (b), causing a predetermined amount of high-purity nitrogen gas in the balance tank (3) to reversely pass via the outlet of the adsorber (2) which is to be switched from regeneration to adsorption while also supplying the crude gas through its inlet.

13 Claims, 6 Drawing Sheets

METHOD AND APPARATUS FOR SEPARATING NITROGEN-ENRICHED GAS

TECHNICAL FIELD

The present invention relates to a method and apparatus for separating nitrogen-enriched gas by pressure swing adsorption (PSA). More specifically, the present invention relates to an improved PSA method and apparatus for separating nitrogen-enriched gas which is capable of enhancing the purity of product nitrogen gas to as high as 99.999%.

In this specification, the purity of nitrogen refers to the ratio of the sum of nitrogen and argon relative to the entire product gas.

BACKGROUND ART

As a method for continously producing nitrogen-enriched gas from mixture gas such as air mainly containing oxygen and nitrogen, it is well known to repetitively perform adsorption and regeneration (desorption) with the use of an apparatus which comprises a plurality of adsorbers packed with carbon molecular sieve (CMS) as an adsorbent. This method utilizes the fact that the oxygen adsorbing ability of CMS varies with pressure.

In general, the oxygen adsorbing ability of CMS increases with increasing pressure. If air is passed through a CMS packed adsorber under high pressure, oxygen contained in air is adsorbed by the CMS to produce gas with a high nitrogen concentration. Conversely, if the adsorber is evacuated under atmospheric pressure or under vacuum to cause a pressure drop in the adsorber, oxygen is desorbed from the CMS, thereby regenerating the CMS.

In a multi-tower PEA method for separating nitrogen gas, one adsorber undergoes adsorption for producing nitrogen-enriched gas while another adsorber undergoes regeneration. Therefore, by alternately repeating these steps, it is possible to realize continuity in nitrogen-enriched gas production because, at all times, either one of the adsorbers produces nitrogen-enriched gas.

A nitrogen gas separating method based on PEA is advantageous for its capability of producing nitrogen-enriched gas conveniently at a relatively low cost. However, such a method is disadvantageous for its difficulty of increasing the purity of nitrogen gas, as compared with a method wherein liquefied nitrogen is vaporized to produce nitrogen gas for industrial applications. Various efforts have been hitherto made to enhance the nitrogen gas purity, but failed to provide satisfactory results. In particular, when using a simple apparatus which performs regeneration under atmospheric pressure, the achievable product nitrogen purity has been limited to 99.9%.

For example, Japanese Patent Publication No. 5-32087 proposes a nitrogen gas separating method which increases the nitrogen purity of product gas to 99.9% by PSA wherein regeneration is performed under atmospheric pressure. A first feature of this method resides in that high-purity product nitrogen gas is passed through an adsorber via its outlet while it performs atmospheric pressure regeneration. A second feature resides in that, after a so-called pressure equalization step, high-purity nitrogen gas from a product receiver is made to reversely flow into an adsorber for advance pressurization before starting adsorption.

The first feature described above, wherein high-purity nitrogen gas is passed through an adsorber undergoing regeneration, is conventionally well known as a measure for increasing the regeneration efficiency of CMS. The second feature described above is conventionally well known as a measure for increasing the purity of product gas in case vacuum is applied for regeneration where no rinsing is available. The method proposed in the above Japanese publication relies on the combination of these known features for additionally increasing nitrogen purity in PSA nitrogen gas separation. As previously described, however, the purity of product nitrogen is still limited to 99.9% even if the method disclosed in the above Japanese publication is employed.

It is, therefore, an object of the present invention to provide a method and apparatus for separating nitrogen gas which is capable of enhancing the nitrogen purity to 99.999% by relatively convenient PSA wherein regeneration is performed under atmospheric pressure.

DISCLOSURE OF THE INVENTION

According to a first aspect of the present invention, there is provided an apparatus for separating nitrogen-enriched gas by PEA, comprising: a plurality of adsorbers packed with carbon molecular sieve; a product receiver of a predetermined capacity interruptibly connected to an outlet of each of the adsorbers; a pressure equalization line interruptibly connecting between the outlets of the adsorbers; crude gas supply means for selectively supplying crude gas to an inlet of said each adsorber, and evacuating means for selectively evacuating discharge gas from the inlet of said each adsorber to an atmospheric pressure exterior; characterized that a balance tank of a predetermined capacity is provided between the outlet of said each adsorber and the product receiver; that the balance tank is connected to the product receiver via a check valve; and that the balance tank is connected to the outlet of said each adsorber through a rinse line which is provided with a check valve and throttling means.

The nitrogen-enriched gas separating apparatus described above is distinguished from a typical prior art multi-tower gas separating PSA apparatus in that the high-purity product gas is separately stored in the balance tank and product receiver which are connected to each other via a check valve, and that the rinse line is provided for passing the high-purity product gas from the balance tank to the outlet of said each adsorber. Since the rinse line is provided only with a check valve and throttling means, there is always a gas flow as long as the pressure of said each adsorber is lower than that of the balance tank, thereby significantly serving to increasing the nitrogen gas purity not only in the regeneration step but also in the pressure equalization step.

Another purpose of providing the balance tank resides in pressure stabilization. Conventionally, since a large amount of product nitrogen gas from a product receiver is allowed to reversely flow directly into an adsorber for rinsing, the pressure within the product receiver fluctuates greatly to result in a problem of adversely affecting the PSA operation itself in addition to making it difficult to maintain stable feed pressure. While this problem may be overcome by increasing the capacity of the product receiver, such a solution has a disadvantage of prolonging the start-up period after activating the apparatus. The inventors have solved this problem by providing a balance tank, and have also found that most preferred results can be obtained if the capacity of the balance tank is made 0.25–2.5 times as large as that of each adsorber.

According to a first embodiment of the present invention, a product line between the outlet of said each adsorber and the balance tank as well as the pressure equalization line is respectively provided with a separate on-off valve. The crude gas supply means comprises an on-off valve for selectively supplying the crude gas to the inlet of said each adsorber. The evacuating means also comprises an on-off valve for selectively evacuating the discharge gas from the inlet of said each adsorber.

According to a second embodiment of the present invention, the crude gas supply means and the evacuating means comprise a common spool valve, and switching of the spool valve causes selective supply of the crude gas to the inlet of said each adsorber and selective evacuation of the discharge gas from the inlet of said each adsorber. Similarly, the product line between the outlet of said each adsorber and the balance tank as well as the pressure equalization line is provided with a common spool valve, and the product gas line and the pressure equalization line are opened and closed by switching the spool valve. According to the above arrangement, it is only necessary to control the operation of the two spool valves, so that the piping system and the control system can be simplified for realizing a size and cost reduction of the apparatus in addition to facilitating maintenance.

According to a second aspect of the present invention, there is provided a method of producing nitrogen-enriched gas with a purity of 95–99.999% from crude gas mainly containing nitrogen and oxygen by alternately repeating pressurized adsorption and atmospheric pressure regeneration with the use of a nitrogen-enriched gas separating apparatus which comprises a plurality of adsorbers packed with carbon molecular sieve, a balance tank, and a product receiver connected to the balance tank via a check valve, the method comprising the steps of:

(a) causing high-purity nitrogen gas in the balance tank to flow, at a predetermined flow rate, to an outlet of a first adsorber which is undergoing regeneration;

(b) establishing communication between the outlet of the first adsorber having finished the regeneration and an outlet of a second adsorber having finished adsorption while opening inlets of both adsorbers, thereby causing a part of relatively high concentration nitrogen gas in the second adsorber to move to the outlet of the first adsorber while also causing said part of nitrogen gas to purge gas in the first adsorber from the inlet thereof; and (c) after performing the above step (b) for a predetermined time, reversely passing a predetermined amount of high-purity nitrogen gas from the balance tank to the outlet of the first adsorber while also supplying the crude gas via the inlet of the first adsorber for pressurization, whereupon the first adsorber is shifted to adsorption by continued supply of the crude gas.

More specifically, in the step (a) (atmospheric pressure regeneration), an adsorber undergoing atmospheric pressure regeneration is washed by the high-purity nitrogen gas from the balance tank. This means that the relevant adsorber will have an enhanced adsorption efficiency when switched to an adsorption step.

In the step (b) (pressure equalization-release), not only the outlets of the respective adsorbers are brought into communication with each other, but also both adsorbers are evacuated via their inlets. As a result, relatively nitrogen-enriched gas moves from one adsorber having finished adsorption to another adsorber having finished regeneration due to a pressure difference between both adsorbers, thereby completely purging, via the relevant inlet, oxygen-enriched gas remaining in said another adsorber immediately after finishing regeneration. Further, since the pressure of said another adsorber is lower than that of the balance tank, the high-purity nitrogen gas from the balance tank is allowed to flow into and fill an outlet side region of said another adsorber.

Finally, in the step (c) (pressurization→adsorption), said another adsorber which has finished regeneration for shifting to adsorption instantaneously undergoes pressurization from a relatively low pressure to a pressure sufficient for efficient adsorption. Since the pressurization is achieved by reverse flow of the high-purity nitrogen gas from the balance tank as well as by supply of crude gas via the inlet, and since the outlet side region of said another adsorber is already filled with high-purity nitrogen gas in the above step (b), it is possible to virtually eliminate entry of impurity gas into the product gas in the subsequent adsorption step.

In this way, the present invention realizes continuous production of nitrogen-enriched gas with an extremely high purity (e.g. 99.999%) by using a multi-tower nitrogen-enriched gas separating PSA apparatus which adopts atmospheric pressure adsorption. The achievable nitrogen purity is virtually equivalent to that obtainable by vaporization of liquefied nitrogen. Thus, the present invention makes a great contribution to industrial fields requiring high-purity nitrogen gas.

The preferred embodiments of the present invention are described below with reference to the accompanying drawings, but these embodiments are only exemplary and not limitative of the present invention.

BEST MODE FOR CARRYING OUT THE INVENTION

The preferred embodiments of the present invention will be described below with reference to the accompanying drawings.

Figure 1:
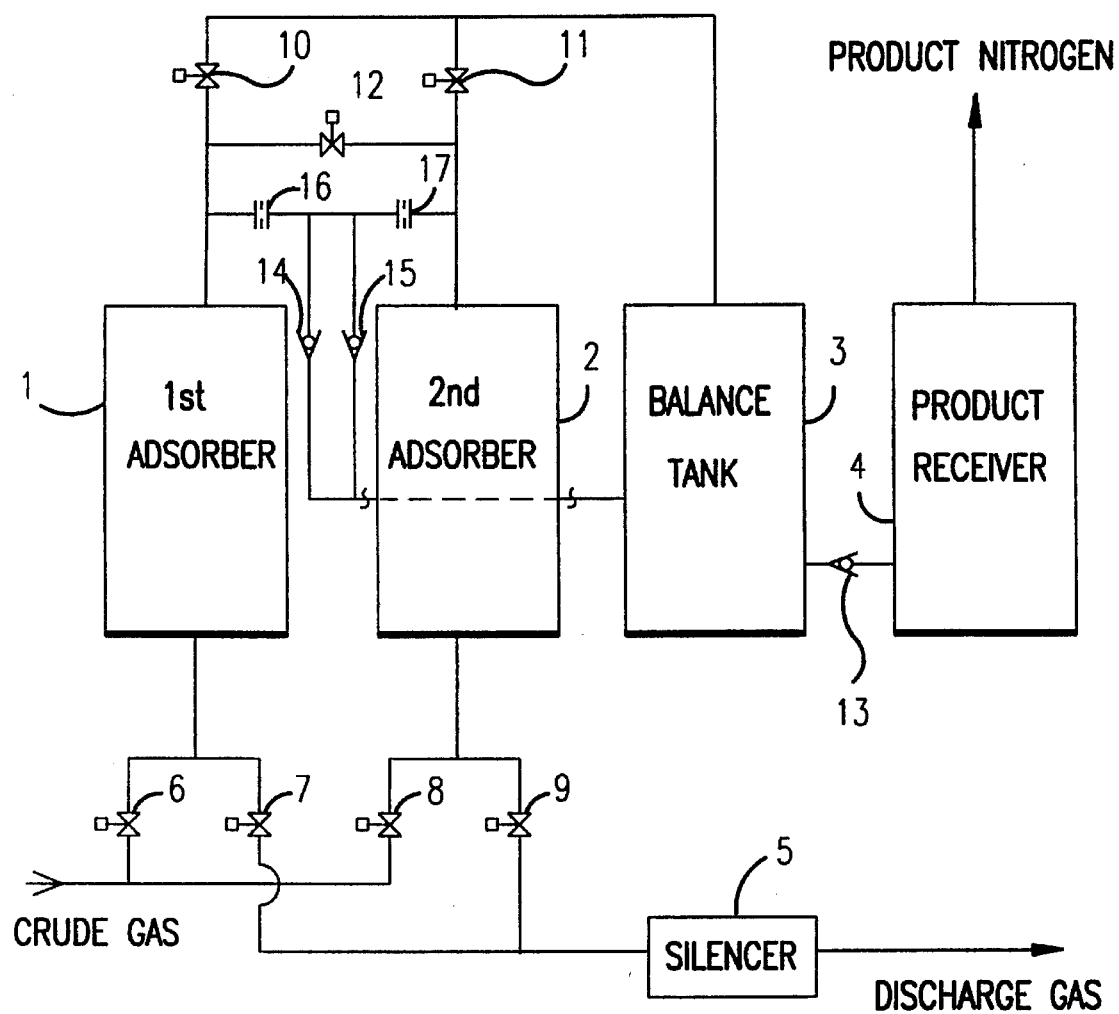
FIG. 1 is a view showing the arrangement of a nitrogen gas enriching PSA apparatus according to a first embodiment of the present invention.

First, FIG. 1 shows a two-tower type PSA apparatus for separating nitrogen-enriched gas according to a first embodiment of the present invention.

The apparatus of the first embodiment includes a first adsorber 1 and a second adsorber 2. Each of these adsorbers 1, 2 is packed with carbon molecular sieve (CMS) to form an adsorption bed. The adsorbers 1, 2 have respective outlets connected to a balance tank 3 through product lines provided with respective on-off valves 10, 11. The balance tank 3 is connected to a product receiver 4 through a line provided with a check valve 13. The check valve 13 allows a gas flow only from the balance tank 3 to the product receiver 4. The highly purified nitrogen gas within the product receiver 4 is suitably used for industrial purposes through a piping.

The product lines extending from the outlets of the respective adsorbers 1, 2 are connected to each other, at a position closer to the adsorbers than the on-off valves 10, 11 through a pressure equalization line provided with an on-off valve 12. Further, rinse lines, provided intermediately with respective check valves 14, 15 and orifices 16, 17, extend from the balance tank 3 for connection to the product lines extending from the outlets of the respective adsorbers 1, 2. The respective check valves 14, 15 allow a flow of rinse gas only from the balance tank 3 to the outlets of the respective adsorbers 1, 2, whereas the orifices 16, 17 restrict the flow rate of the rinse gas. Instead of providing the respective orifices 16, 17 on both rinse lines, a single orifice may be provided on a non-branched portion of the rinse lines connected to the balance tank 3.

The inlets of the respective adsorbers 1, 2 are connected to crude gas supply lines provided with respective on-off valves 6, 8. Further, the inlets of the respective adsorbers 1, 2 are also connected to discharge lines provided with respective on-off valves 7, 9, and the discharge lines are held open to an atmospheric pressure exterior through a silencer 5.

Next, using the above-described apparatus, the steps of a method for separating nitrogen-enriched gas are described.

[Step (a)]

It is now assumed that the first adsorber 1 is under adsorption while the second adsorber 2 is under regeneration. Under this assumption, in step (a), the valves 6, 10 are open with the valve 7 closed, with respect to the first adsorber 1. With respect to the second adsorber 2, the valves 8, 11 are closed with the valve 9 held open. Further, the valve 12 on the pressure equalization line is closed.

Crude gas such as air or the like mainly containing nitrogen and oxygen is supplied through the relevant crude gas supply line and valve 6 to the first adsorber 1 so that the maximum pressure within the first adsorber 1 reaches at least 5.0 kg/cm²G (G: gauge pressure), e.g. 6.5 kg/cm²G. Oxygen contained in the crude gas is adsorbed in the first adsorber 1, so that nitrogen-enriched product gas is conducted to the balance tank 3 through the relevant product line and valve 10. In this case, the pressure within the product receiver 4 becomes 6.5 kg/cm²G, and this pressure is maintained by the check valve 13 even if the pressure in the balance tank 3 drops.

On the other hand, since the second adsorber 2 is open to the atmospheric pressure exterior through the relevant discharge line and valve 9, the pressure within the second adsorber 2 drops to the atmospheric pressure. Due to such a pressure drop, the oxygen previously adsorbed by the adsorption bed is desorbed for discharge. As a result, the second adsorber 2 is regenerated for repeated adsorption.

In the regeneration of the second adsorber 2, since the pressure in the second adsorber 2 is lower than that in the balance tank 3, the high-purity nitrogen gas from the balance tank 3 is introduced to the outlet of the second adsorber 2 through the rinse line. As a result, the high-purity nitrogen gas assists oxygen desorption from the adsorption bed, thereby enhancing the regeneration efficiency. Considering the production efficiency of nitrogen-enriched gas and the yield, the flow rate of the high-purity nitrogen gas passed through the rinse line is suitably set by the orifice 17 within a range lower than the total amount of the nitrogen-enriched gas produced by the first adsorber 1.

When the adsorption bed in the first adsorber 1 approaches an adsorption limit, next step (b) follows.

[Step (b)]

In step (b), the respective valves take the following states. With respect to the first adsorber 1, the valves 6, 10 are closed, and the valve 7 is held open. With respect to the second adsorber 2, the valves 8, 11 are closed, and the valve 9 is held open. Further, the valve 12 on the pressure equalization line is opened. Considering the state changes from the step (a), the valves 6, 10 are switched from ON to OFF with the valves 7, 12 switched from OFF to ON, whereas the valves 8, 9, 11 for the second adsorber 2 retain the same states as in the step (a). As a result, the outlets of the respective adsorbers 1, 2 communicate with each other through the pressure equalization line and valve 12, whereas the inlets of the respective adsorbers 1, 2 are opened to the atmospheric pressure exterior through the respective discharge lines and valves 7, 9.

In an intial stage after the above-described valve switching, since the pressure in the first adsorber 1 is higher than that in the second adsorber 2, a relatively nitrogen-enriched gas portion remaining at the outlet side of the first adsorber 1 moves to the outlet of the second adsorber 2 through the pressure equalization line and valve 12 due to the pressure difference between both adsorbers 1, 2. This results in that both towers 1, 2 become higher than an atmospheric pressure, so that both adsorbers 1, 2 are subjected to evacuation from their respective inlets.

Considering the second adsorber 2, a relatively oxygen-enriched gas portion likely to remain at its inlet side region after the above-described step (a) is purged to the exterior through the discharge line by the introduction of the nitrogen-enriched gas portion due to the above-described gas movement. In this condition, additionally, since the pressure in the second adsorber 2 is still lower than that in the balance tank 3, the high-purity nitrogen gas is introduced to the outlet through the rinse line, which results in that an outlet side region within the second adsorber 2 is filled with the high-purity nitrogen gas.

Considering the first adsorber 1, since its inlet is open to the atmospheric pressure exterior, a part of regeneration has virtually started, which provides an expected improvement of the regeneration efficiency.

This step (b) continues for a predetermined time and is followed by next step (c). The duration of the step (b) is suitably set so that the ratio in absolute pressure between the first adsorber 1 and the second adsorber 2 lies in a range of 0.05–0.95.

[Step (c)]

Conversely to the step (a), the states of the respective valves are selected in step (c) so as to perform regeneration for the first adsorber 1 and adsorption for the second adsorber 2. Specifically, with respect to the first adsorber, the valves 6, 10 are closed with the valve 7 opened. With respect to the second adsorber 2, the valves 8, 11 are opened with the valve 9 closed. Further, the valve 12 on the pressure equalization line is closed. Considering the state changes from the step (b), the valve 12 is switched from ON to OFF, the valves 8, 11 from OFF to ON, and the valve 9 from ON to OFF, whereas the valves 6, 7, 10 for the first adsorber 1 retain the same states as in the step (b).

In an initial stage after the above-described valve switching, since the pressure within the second adsorber 2 is low, the high-purity nitrogen gas from the balance tank 3 is allowed to flow reversely via the outlet of the second adsorber through the relevant product gas line and valve 11, while the crude gas is also supplied via the inlet, so that the adsorber internal pressure rises instantaneously to a value suitable for adsorption.

The rate of reverse flow of the high-purity nitrogen from the balance tank 3 depends on the capacity of the balance tank 3. However, the reverse flow rate of the high-purity nitrogen should be determined so that the pressure in the second adsorber 2 rises, upon finishing the reverse flow, at least to a value which is no less than 40% but less than 60%, preferably 50–55%, of the maximum pressure exhibited during adsorption. Though dependable on the ability of supplying the crude gas, the capacity of the balance tank 3 is preferably 0.25–2.5 times as large as that of each adsorber. Further, the ratio between the reverse flow rate of the nitrogen-enriched gas and the supply flow rate of the crude gas up to a point of finishing the reverse flow lies preferably in a range of 1:2 to 2:1.

Though the above-described reverse flow of the high-purity nitrogen gas causes a pressure drop in the balance tank 3, such a pressure drop does not influence the product receiver 4 due to the intervention of the check valve 13 between both tank 3 and receiver 4. As a result, it is possible to regulate pressure fluctuations in the product receiver 4, thereby contributing to a steady supply of the nitrogen-enriched gas.

Simultaneously with the reverse flow of the high-purity nitrogen gas, the second adsorber 2 shifts to adsorption due to the supply of the crude gas via its inlet. As a result, nitrogen-enriched product gas is conveyed to the balance tank 3 and the product receiver 4 through the product line.

On the other hand, the first adsorber 1 undergoes regeneration wherein the high-purity nitrogen gas from the balance tank 3 is passed at a predetermined flow rate through the rinse line to enhance the regeneration efficiency, as described for the step (a) with respect to the second adsorber 2. Further, since the bottom of the first adsorber 1 is already open to the atmospheric pressure exterior in the step (b), a part of regeneration has already started to enhance the regeneration efficiency of the first adsorber 1, as previously described above.

The step (b) in the above-described method differs symbolically from the pressure equalization in the prior art PSA gas separation, and this step (b) contributes greatly to an increase of nitrogen purity to 99.999%. Specifically, the desorbed oxygen mostly remaining at the inlet side region of the adsorber which has finished regeneration is purged out of the tower almost completely by the relatively nitrogen-enriched gas sent from the outlet of the other adsorber through the equalization line. This eliminates the factor which has hitherto hindered enhancement of nitrogen purity beyond 99.9%. Besides, in this step (b), the outlet side region of the relevant tower interior is filled with the high-purity nitrogen gas supplied through the rinse line, thereby drastically reducing the likelihood of impurity entry into the product gas in an initial stage of subsequent adsorption.

Further, in the step (c), the high-purity nitrogen gas from the balance tank 3 is reversely conveyed via the outlet of the relevant adsorber, while the crude gas is simultaneously supplied via its inlet. Thus, the relevant adsorber is instantaneously pressurized to a pressure suitable for adsorption by the high pressure gases simultaneously supplied from its outlet and inlet.

As described previously, since the outlet side region of the relevant adsorber is already filled with the high-purity nitrogen gas in the step (b), this nitrogen gas is further forced toward the inlet side by the above-described reverse flow of the high-purity nitrogen gas. As a result, the possibility that oxygen from the crude gas enters in the product gas as impurity is almost completely excluded.

In this way, the above-described method almost completely eliminates the possibility of impurity gas entry into the product gas which is likely to occur when shifting from regeneration to adsorption. As a result, it becomes possible for the first time to achieve a high purity of 99.999%.

FIGS. 2 to 5 show a two-tower type PEA apparatus for separating nitrogen-enriched gas according to a second embodiment of the present invention. The second embodiment mainly differs from the first embodiment shown in FIG. 1 in the following points.

A first main difference resides in that the on-off valves 6, 8 on the crude gas supply lines connected to the inlets of the respective adsorbers 1, 2 as well as the on-off valves 7, 9 on the discharge lines connected to the inlets of the respective adsorbers according to the first embodiment are replaced by a first spool valve SV1 having five ports $P_{1(1)}$, $P_{1(2)}$, $P_{1(3)}$, $P_{1(4)}$, $P_{1(5)}$ according to the second embodiment. A second main difference resides in that the on-off valves 10, 11 on the product gas lines connecting the outlets of the respective adsorbers to the balance tank as well as the on-off valve 12 on the pressure equalization line are replaced by a second spool valve SV2 having five ports $P_{2(1)}$, $P_{2(2)}$, $P_{2(3)}$, $P_{2(4)}$, $P_{2(5)}$ according to the second embodiment.

Figure 2:
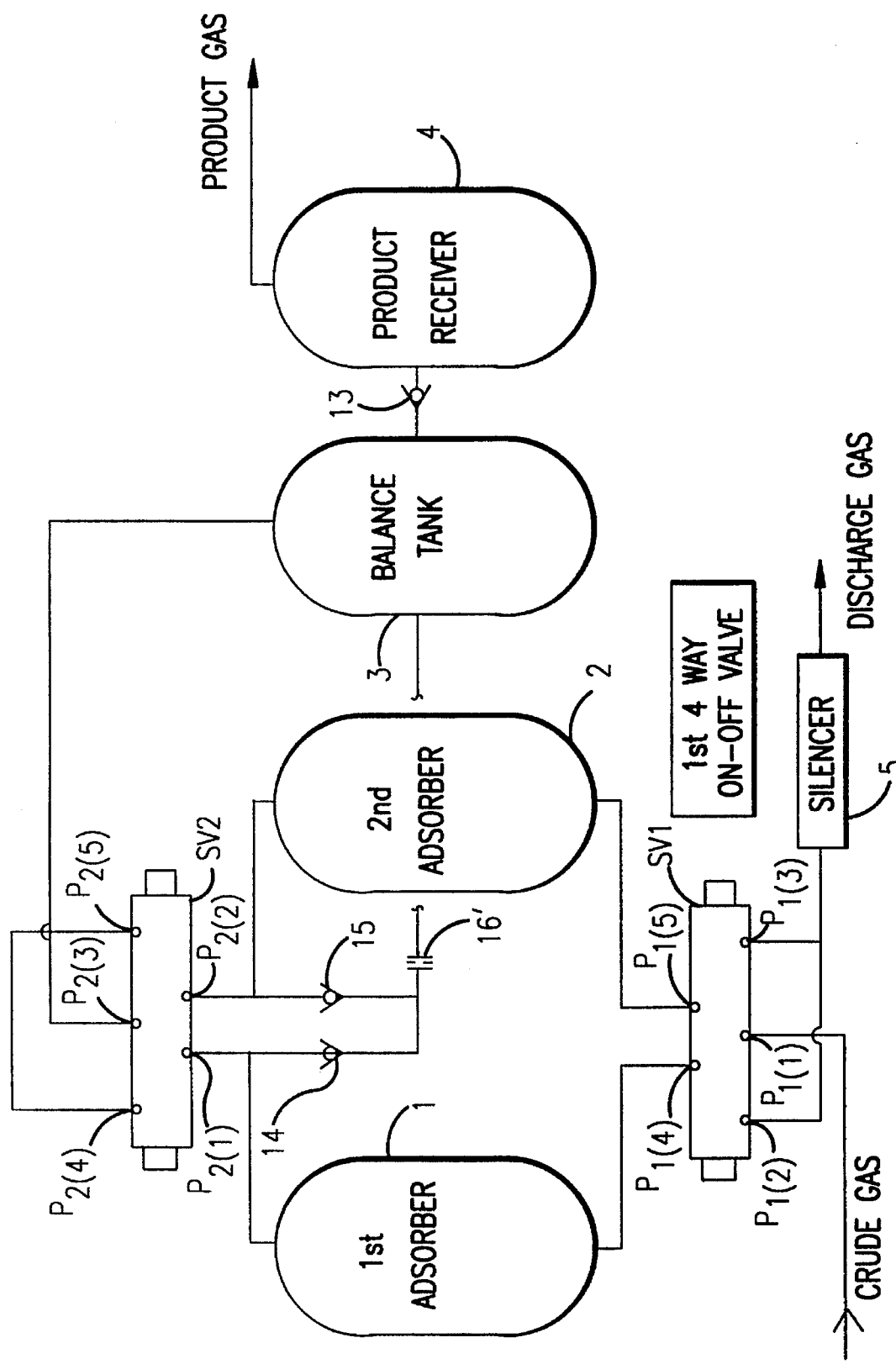
FIG. 2 is a view showing the arrangement of a nitrogen gas enriching PBA apparatus according to a second embodiment of the present invention.
Figure 3:
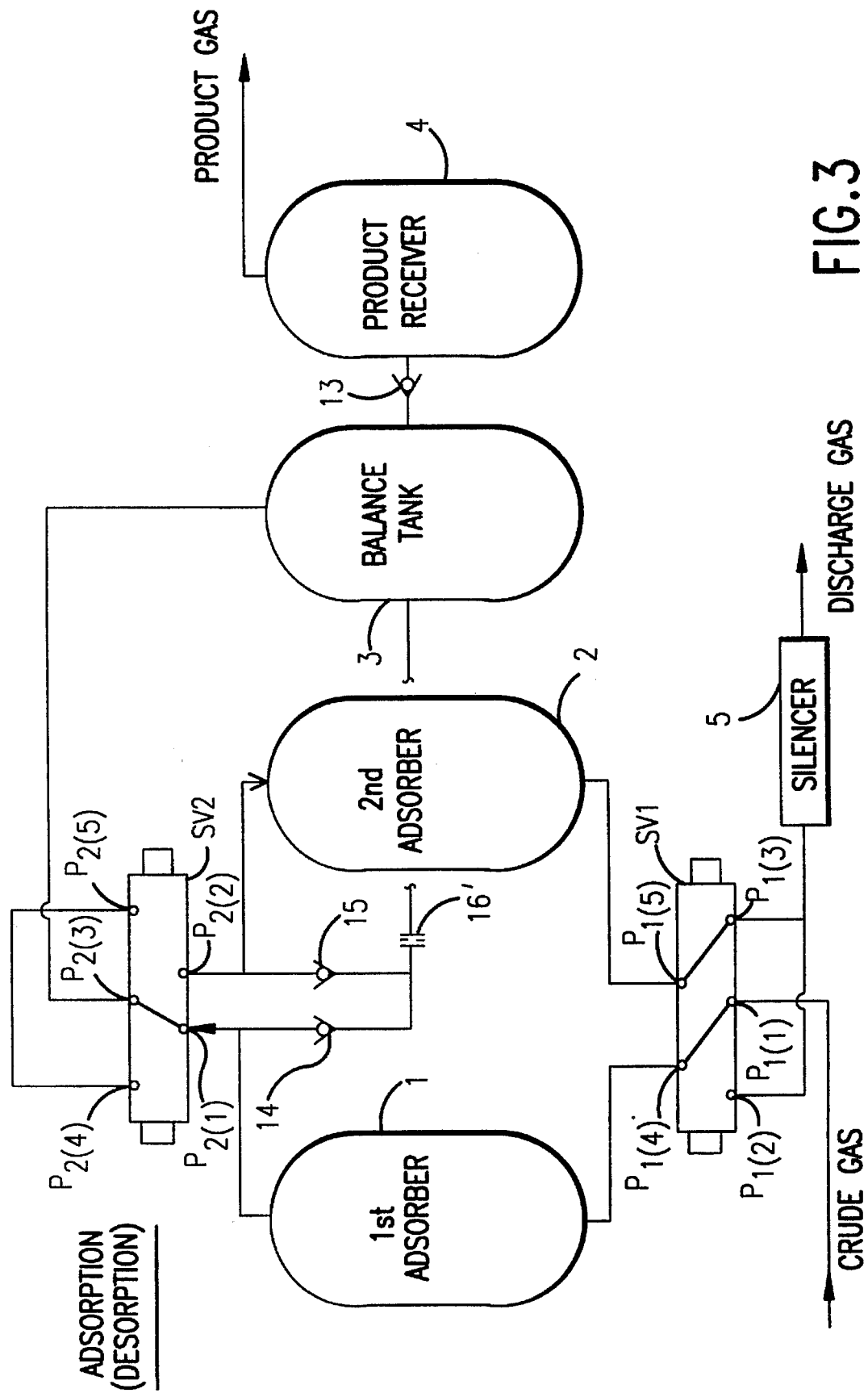
FIG. 3 is a view showing the adsorption (desorption) step of the second embodiment.

As shown in FIG. 2, one side of the first spool valve SV1 (first 4-way on-off valve) is formed with a first port $P_{1(1)}$ connected to a crude gas supply line, and a second and a third ports $P_{1(2)}$, $P_{1(3)}$ connected to discharge lines. The other side of the first spool valve SV1 is provided with a fourth and a fifth ports $P_{1(4)}$, $P_{1(5)}$ respectively connected the inlets of the first and second adsorbers 1, 2 through lines. The above-described discharge lines are provided with a silencer 5, as in the first embodiment.

In the first spool valve SV1, an on-off valve corresponding to the one numbered 6 in FIG. 1 is provided between the first port $P_{1(1)}$ and the fourth port $P_{1(4)}$, whereas an on-off valve corresponding to the one numbered 8 in FIG. 1 is provided between the first port $P_{1(1)}$ and the fifth port $P_{1(5)}$. Further, an on-off valve corresponding to the one numbered 7 in FIG. 1 is provided between the second port $P_{1(2)}$ and the fourth port $P_{1(4)}$, whereas an on-off valve corresponding to the one numbered 9 in FIG. 1 is provided between the third port $P_{1(3)}$ and the fifth port $P_{1(5)}$.

On the other hand, one side of the second spool valve SV2 is provided with a first and a second ports $P_{2(1)}$, $P_{2(2)}$ connected respectively to product gas lines extending from the outlets of the first adsorber 1 and second adsorber 2. Further, the other side of the second spool valve SV2 is provided with a third port $P_{2(3)}$ connected to the balance tank 3 through a line, as well as a fourth and a fifth ports $P_{2(4)}$, $P_{2(5)}$ connected to each other through a pressure equalization line. Similarly to the first embodiment, branching rinse lines extend from the balance tank 3 for joining with the respective product gas lines, and are provided with respective check valves 12, 15. Further, the rinse lines have a non-branching portion which is provided with a single orifice 16'. In this respect, the second embodiment is also different from the first embodiment of FIG. 1 (where two orifices 16, 17 are provided).

In the second spool valve SV2, an on-off valve corresponding to the one numbered 10 in FIG. 1 is provided between the first port $P_{2(1)}$ and the third port $P_{2(3)}$, whereas an on-off valve corresponding to the one numbered 11 in FIG. 1 is provided between the second port $P_{2(2)}$ and the third port $P_{2(3)}$. Further, a common on-off valve corresponding to the one numbered 12 in FIG. 1 is provided between the first port $P_{2(1)}$ and the fourth port $P_{2(4)}$ as well as between the second port $P_{2(2)}$ and the fifth port $P_{2(5)}$.

The arrangement of the second embodiment is otherwise similar to that of the first embodiment shown in FIG. 1. The apparatus of the second embodiment operates in the following manner for performing a method of separating nitrogen-enriched gas.

[Step (a)]

It is now assumed that the first adsorber 1 is under adsorption while the second adsorber 2 is under regeneration. Under this assumption, in step (a), the first spool valve SV1 and the second spool valves SV2 take the respective states shown in FIG. 3. Crude gas is supplied to the inlet of the first adsorber 1 through the first port $P_{1(1)}$ and fourth port $P_{1(4)}$ of the first spool valve SV1 so that the maximum pressure within the first adsorber 1 reaches at least 5.0 kg/cm$^2$G, e.g. 6.5 kg/cm$^2$G. Oxygen contained in the crude gas is adsorbed in the first adsorber 1, so that nitrogen-enriched product gas is conducted to the balance tank 3 through the first port $P_{2(1)}$ and third port $P_{2(3)}$ of the second spool valve SV2.

On the other hand, since the inlet of the second adsorber 2 is open to the atmospheric pressure exterior through the fifth port $P_{1(5)}$ and third port $P_{1(3)}$ of the first spool valve SV1, the pressure within the second adsorber 2 drops to the atmospheric pressure. Due to such a pressure drop, the oxygen previously adsorbed by the adsorption bed is desorbed for discharge. As a result, the second adsorber 2 is regenerated for next adsorption.

In the regeneration of the second adsorber 2, since the pressure in the second adsorber 2 is lower than that in the balance tank 3, the high-purity nitrogen gas from the balance tank 3 is introduced to the outlet of the second adsorber 2 through the rinse line. As a result, the high-purity nitrogen gas assists oxygen desorption from the adsorption bed, thereby enhancing the regeneration efficiency. The flow rate of the high-purity nitrogen gas passed through the rinse line is suitably throttled by the orifice 16'.

When the adsorption bed in the first adsorber 1 approaches an adsorption limit, next step (b) follows.

[Step (b)]

Figure 4:
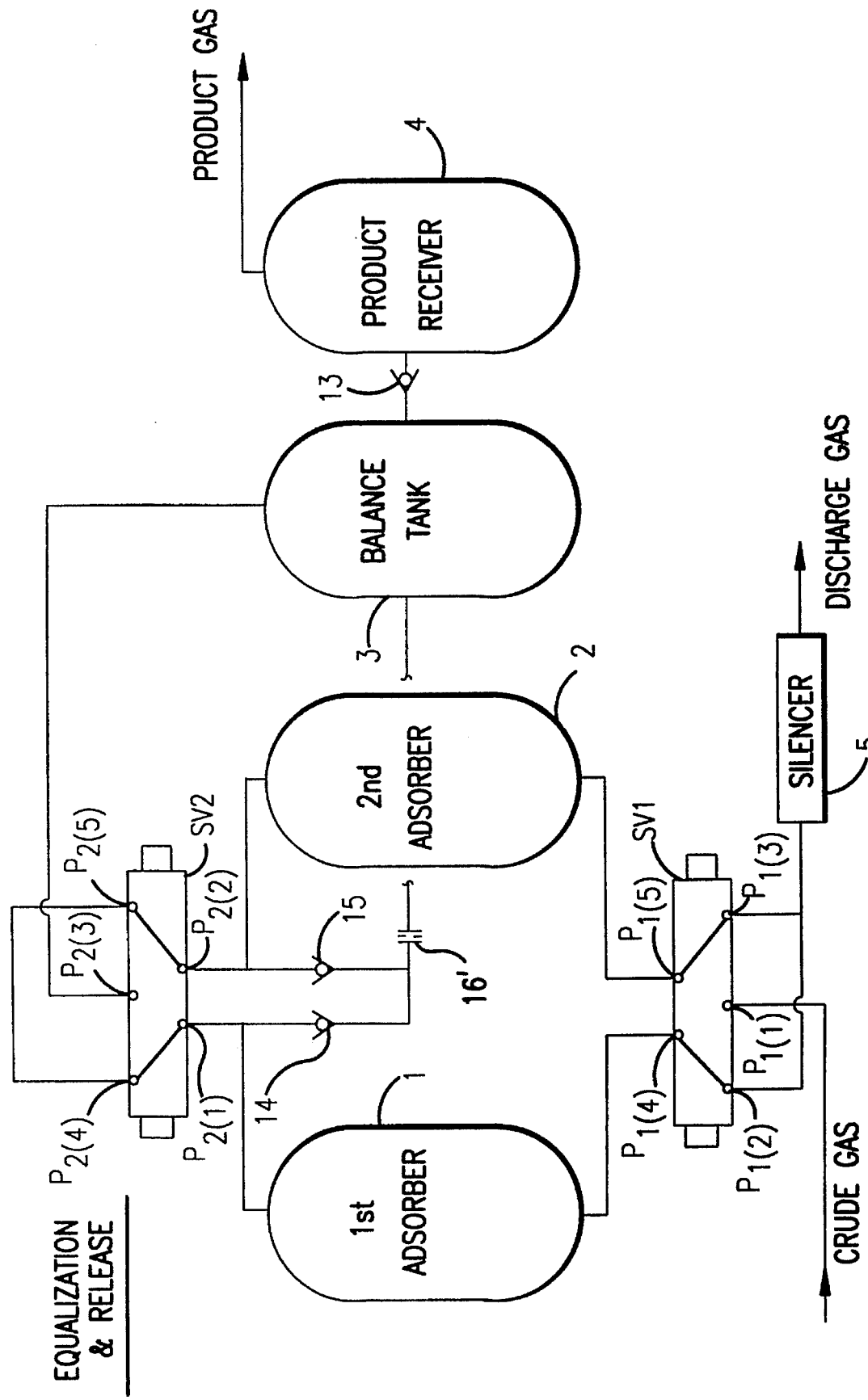
FIG. 4 is a view showing the pressure equalization and release step of the second embodiment.

In step (b), the first spool valve SV1 and the second spool valve SV2 shift to the respective states shown in FIG. 4. As a result, the outlets of the respective adsorbers 1, 2 communicates with each other through the first port $P_{2(1)}$, fourth port $P_{2(4)}$, second port $P_{2(2)}$ and fifth port $P_{2(5)}$ of the second spool valve SV2 as well as the pressure equalization line, whereas the inlets of the respective adsorbers 1, 2 are rendered open to the atmospheric pressure exterior through the second port $P_{1(2)}$, fourth port $P_{1(4)}$, third port $P_{1(3)}$ and fifth port $P_{1(5)}$ of the first spool valve SV1 as well as the respective discharge lines.

In an intial stage after such switching of the respective spool valves SV1, SV2, since the pressure in the first adsorber 1 is higher than that in the second adsorber 2, a relatively nitrogen-enriched gas portion remaining at the outlet side region of the first adsorber 1 moves to the outlet of the second adsorber 2 through the pressure equalization line due to the pressure difference between both adsorbers 1, 2. This results in that both adsorbers 1, 2 become higher than an atmospheric pressure, so that both adsorbers 1, 2 are subjected to evacuation from their respective inlets.

Considering the second adsorber 2, a relatively oxygen-rich gas portion likely to remain at its inlet side region upon the above-described step (a) is purged to the atmosphere through the discharge line by the introduction of the nitrogen-enriched gas portion due to the above-described gas movement. In this condition, additionally, since the pressure in the second adsorber 2 is still lower than that in the balance tank 3, the high-purity nitrogen gas is introduced to the outlet through the rinse line. As a result, an outlet side region within the second adsorber 2 is filled with the high-purity nitrogen gas.

Considering the first adsorber 1, since its inlet is open to the atmospheric pressure exterior, a part of regeneration has virtually started, which provides an expected improvement of regeneration efficiency.

This step (b) continues for a predetermined time and is followed by next step (c). The duration of the step (b) is suitably set so that the ratio in absolute pressure between the first adsorber 1 and the second adsorber 2 lies in a range of 0.05–0.95.

[Step (c)]

Figure 5:
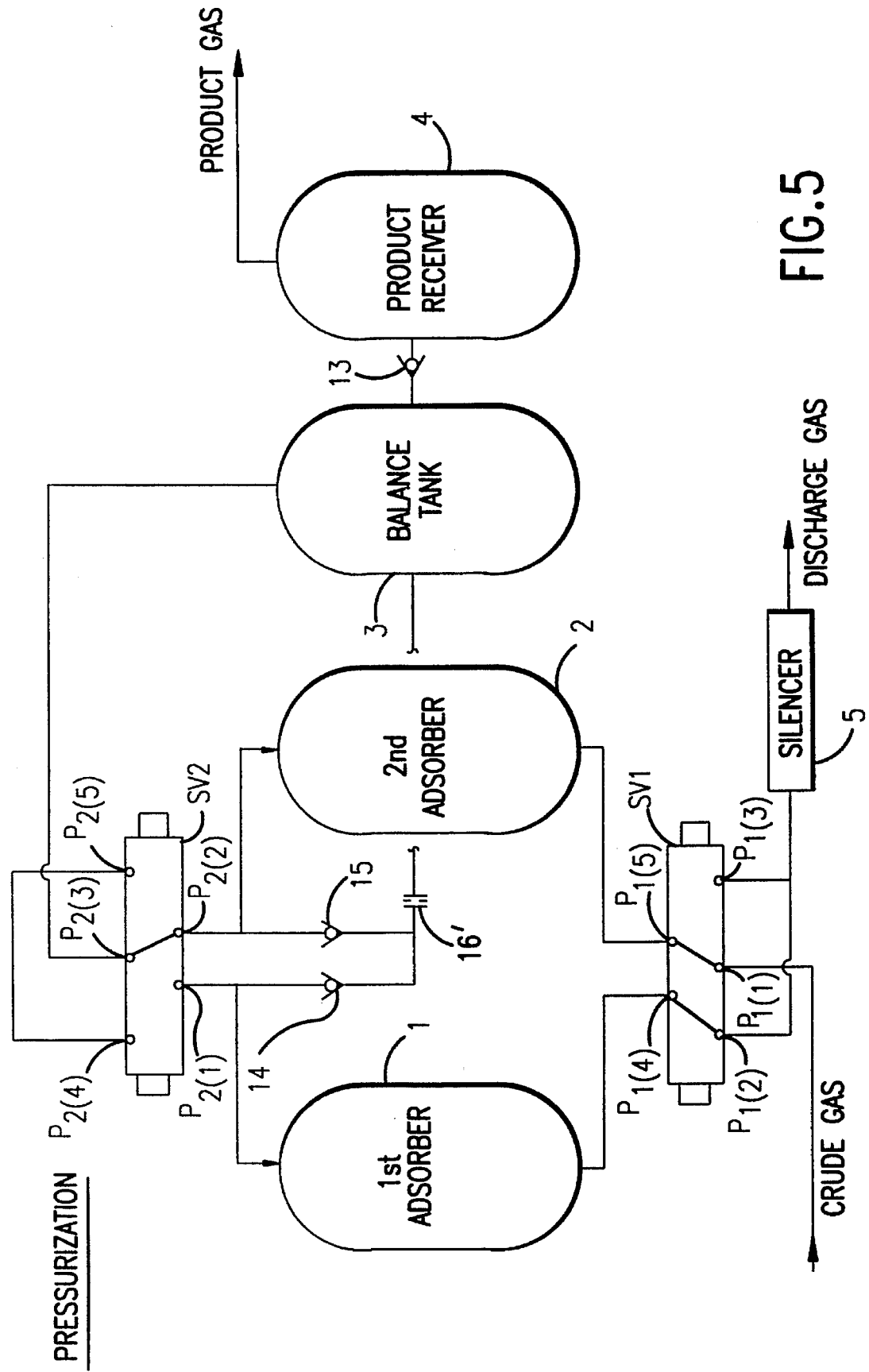
FIG. 5 is a view showing the pressurization and backwashing step or desorption (adsorption) step according to the second embodiment.

Conversely to the step (a), the states of the respective spool valves SV1, SV2 are selected in step (c) so as to perform regeneration for the first adsorber 1 and adsorption for the second adsorber 2, as shown in FIG. 5.

In an initial stage after such switching of the spool valves SV1, SV2, since the pressure within the second adsorber 2 is low, the high-purity nitrogen gas from the balance tank 3 is allowed to flow reversely into the outlet of the second adsorber through the relevant product gas line, while the crude gas is also supplied via the inlet, so that the internal pressure of the adsorber rises instantaneously to a value suitable for adsorption. The rate of reverse flow of the high-purity nitrogen from the balance tank 3 depends on the capacity of the balance tank 3.

Simultaneously with the reverse flow of the high-purity nitrogen gas, the second adsorber 2 shifts to adsorption due to the supply of the crude gas via its inlet. Nitrogen-enriched product gas is conveyed to the balance tank 3 and the product receiver 4 through the product line.

On the other hand, the first adsorber 1 undergoes regeneration wherein the high-purity nitrogen gas from the balance tank 3 is passed at a predetermined flow rate through the rinse line to enhance the regeneration efficiency, as described for the step (a) with respect to the second adsorber 2. Further, since the bottom of the first adsorber 1 is already open to the atmospheric pressure exterior in the step (b), a part of regeneration has already started to enhance the regeneration efficiency of the first adsorber 1, as previously described above.

In this way, the second embodiment illustrated in FIGS. 2 to 5 is capable of performing substantially the same operation as the first embodiment, which provides nitrogen-enriched gas with an extremely high purity. In particular, it is only necessary to switchingly operate the two spool valves SV1, SV2 according to the second embodiment, so that the apparatus including the associated pipings can be greatly simplified to facilitate control and maintenance.

Next, a more specific example and comparative examples are given below.

[EXAMPLE 1]

In Example 1, use is made of a nitrogen-enriched gas separating PSA apparatus shown in FIG. 1. The apparatus included two adsorbers 1, 2, a balance tank 3 and a product receiver 4. Both adsorbers 1, 2 were packed with CMS, and the balance tank 3 had the same capacity as each of the adsorbers 1, 2. Air was used as crude gas, and adsorption was performed to achieve a maximum pressure of 6.5 kg/cm$^2$G. A PSA cycle of 80 seconds was performed which comprised an atmospheric pressure regeneration step including high-purity nitrogen gas rinsing, a pressure equalization-release step, and a pressurization step followed by an adsorption step.

In the pressure equalization-release step, the first adsorber 1 had finished the adsorption step, whereas the second adsorber 2 had finished the atmospheric pressure regeneration step. The valve 12 and the valves 7, 9 were held open to pass a part of the gas contained in the first adsorber 1 to the outlet of the second adsorber 2 through the pressure equalization line by utilizing a pressure difference while also evacuating both adsorbers from their respective inlets through the discharge lines. In this step, since the pressure in the two adsorbers were lower than that in the balance tank, the high-purity nitrogen gas from the balance tank was introduced through the rinse lines to fill the outlet side internal regions of the respective adsorbers. The time set for this step was 1.5 seconds.

In the pressurization step, the internal pressure of the second adsorber 2 having received nitrogen gas in the preceding pressure equalization-release step was raised to a pressure of 4.6 kg/cm$^2$G by supplying air through the valve 8 while, at the same time, reversely passing the high-purity nitrogen gas from the balance tank 3. The pressurization step was completed by a subsequent shift to the adsorption step. The ratio between the flow rate of the air and the flow rate of the reversely passed high-purity nitrogen gas was 3:2. The first adsorber 1, on the other hand, shifted to the atmospheric regeneration step. During the pressurization step, the pressure of the balance tank 3 fluctuated in a range of 6.5–4.6 kg/cm$^2$G, whereas the pressure fluctuation in the product receiver was maintained at 6.5–6.3 kg/cm$^2$G.

Considering the quality, the nitrogen-enriched gas obtained in Example 1 had a remaining oxygen concentration of 5 ppm (nitrogen purity of 99.9995%), and was stable at an atmospheric dew point of about –80° C. The nitrogen-enriched gas was produced at a rate of 10 Nm$^3$/H (N representing the standard state).

It is added that a similar result was also obtained when a similar operation was performed using the apparatus illustrated in FIGS. 2 to 5.

[COMPARISON 1]

Figure 6:
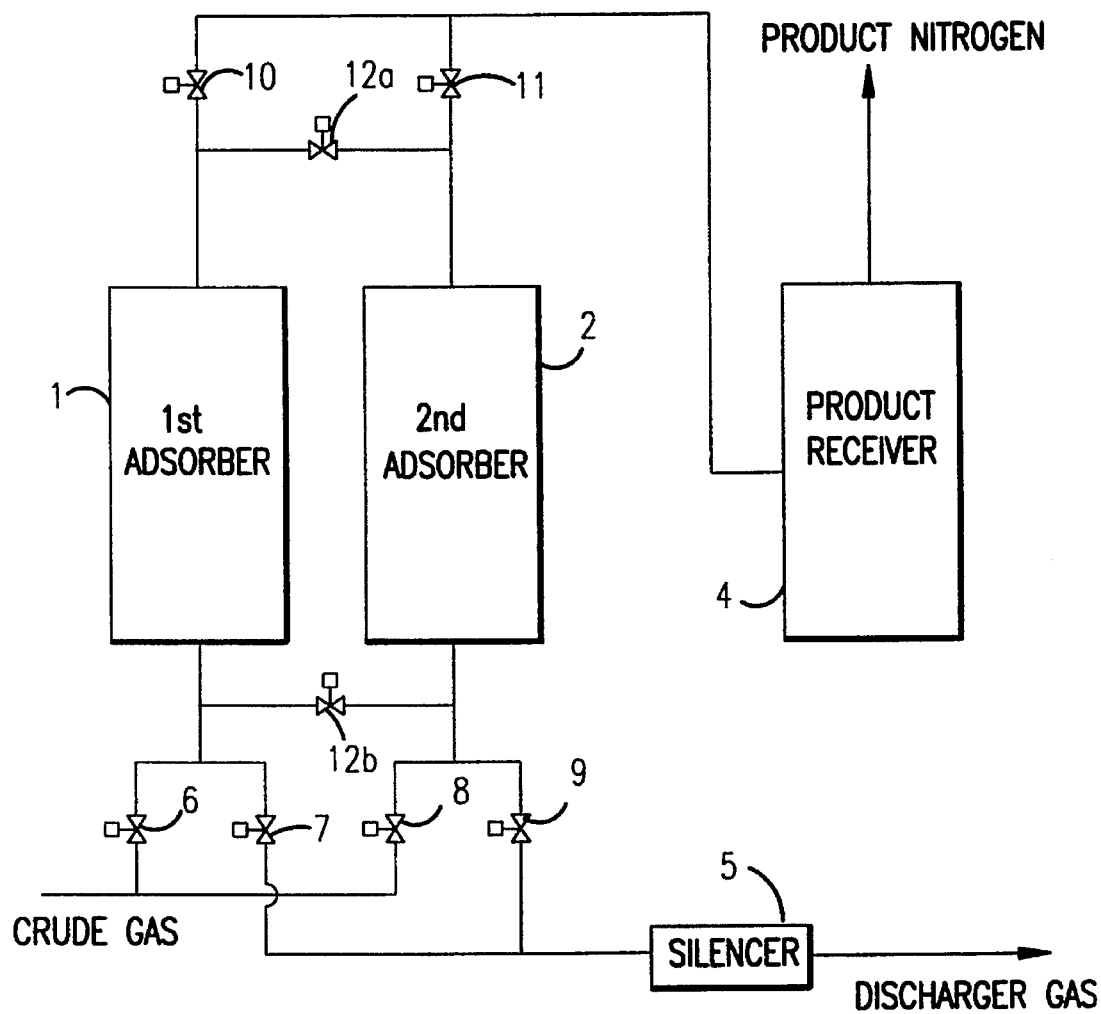
FIG. 6 is a view showing the arrangement of an apparatus used for carrying out comparative example 1.

For comparison with the present invention, the apparatus shown in FIG. 6 was used to perform a typical conventional method of separating nitrogen-enriched gas by PSA wherein regeneration takes place under atmospheric pressure. The apparatus of FIG. 6 differed from the first embodiment apparatus of FIG. 1 only in that a balance tank together with its associated elements was omitted, and that an upper and a lower pressure equalization lines respectively provided with on-off valves 12a, 12b were provided. In a pressure equalization step, only the on-off valves 12a, 12b were made open, but all of the other valves were closed.

In Comparison 1, a remaining oxygen concentration of 1000 ppm (nitrogen purity of 99.9%) was obtained when nitrogen-enriched gas was produced at a rate of 10 Nm$^3$/H.

[COMPARISON 2]

In Comparison 2, the same method as in Example 1 was performed except that, after finishing the pressure equalization-release step, the pressurization was achieved solely by reverse flow of the high-purity nitrogen gas from the balance tank without supplying air. During this step, the pressure fluctuation range of the balance tank 3 expanded to 6.5–3.7 kg/cm$^2$G, and the pressure fluctuation range of the product receiver expanded to 6.5–6.0 kg/cm$^2$G. Compared with Example 1, the influence of this change appeared as a purity drop of nitrogen gas where it had a remaining oxygen concentration of 100 ppm (nitrogen purity of 99.99%) when nitrogen-enriched gas was produced at a rate of 10 Nm$^3$/H.

The present invention is not limited to the above embodiments and example. In particular, the apparatus used for carrying out the method of the present invention is not limited to the illustrated one. Characterizing features of the apparatus include the provision of a balance tank between the product receiver and the respective adsorbers, as well as the provision of a rinse line provided with a check valve and an orifice between the balance tank and each adsorber, so that a typical arrangement of a multi-tower PSA gas separating apparatus may be adopted for the other elements.

Further, a purity of 99.999% for nitrogen-enriched gas is not an essential requirement for the present invention. Enhancement of the purity of nitrogen-enriched gas to 99.999% is only an advantage of the present invention, but the nitrogen gas purity may become lower than 99.999% depending on the setting of the operating conditions. An important point of the present invention resides in expanding the achievable purity range of the produced nitrogen-enriched gas toward a higher level. Thus, any method which includes the steps set forth in the appended claims is included in the technical scope of the present invention.

We claim:

1. An apparatus for separating nitrogen-enriched gas by PSA, comprising: a plurality of adsorbers packed with carbon molecular sieve; a product receiver of a predetermined capacity interruptibly connected to an outlet of each of the adsorbers; a pressure equalization line interruptibly connecting between the outlets of the adsorbers; crude gas supply means for selectively supplying crude gas to an inlet of said each adsorber, and evacuating means for selectively evacuating discharge gas from the inlet of said each adsorber to an atmospheric pressure exterior; characterized:

that a balance tank of a predetermined capacity is provided between the outlet of said each adsorber and the product receiver;

that the balance tank is connected to the product receiver via a check valve; and that the balance tank is connected to the outlet of said each adsorber through a rinse line which is provided with a check valve and throttling means.

2. The apparatus according to claim 1, wherein a product line between the outlet of said each adsorber and the balance tank as well as the pressure equalization line is respectively provided with a separate on-off valve, the crude gas supply means comprising an on-off valve for selectively supplying the crude gas to the inlet of said each adsorber, the evacuating means also comprising an on-off valve for selectively evacuating the discharge gas from the inlet of said each adsorber.

3. The apparatus according to claim 1, wherein the crude gas supply means and the evacuating means comprise a common spool valve, switching of the spool valve causing selective supply of the crude gas to the inlet of said each adsorber and selective evacuation of the discharge gas from the inlet of said each adsorber.

4. The apparatus according to claim 1, wherein the product line between the outlet of said each adsorber and the balance tank as well as the pressure equalization line is provided with a common spool valve, the product gas line and the pressure equalization line being opened and closed by switching the spool valve.

5. The apparatus according to claim 1, wherein the rinse line has branching portions for connection to the respective adsorbers, and a non-branching portion for connection the balance tank, the throttling means comprises separate orifices provided respectively on the branching portions.

6. The apparatus according to claim 1, wherein the rinse line has branching portions for connection to the respective adsorbers, and a non-branching portion for connection the balance tank, the throttling means comprises a single orifice provided on the non-branching portion.

7. The apparatus according to claim 1, wherein the capacity of the balance tank is 0.25–2.5 times as large as that of said each adsorber.

8. A method of separating nitrogen-enriched gas from crude gas mainly containing nitrogen and oxygen by alternately repeating pressurized adsorption and atmospheric pressure regeneration with the use of the apparatus defined in claim 1, the method comprising the steps of:

(a) causing crude gas supply means to supply the crude gas to an inlet of one adsorber for performing adsorption, whereas regeneration is performed for another adsorber by causing evacuating means to evacuate discharge gas from an inlet of said another adsorber while passing, through a rinse line, high-purity nitrogen gas from a balance tank to an outlet of said another adsorber which is undergoing regeneration;

(b) after finishing the above step (a), introducing a part of gas contained in said one adsorber to said another adsorber via the outlet thereof through the pressure equalizing line by utilizing a pressure difference between both adsorbers while also causing the evacuating means to evacuate the discharge gas from the inlets of both adsorbers; and (c) after performing the above step (b) for a predetermined time, reversely passing the high-purity nitrogen gas from the balance tank to said another adsorber via its outlet through a product line while also supplying the crude gas via the inlet of said another adsorber for pressurization, whereupon said another adsorber is shifted to adsorption by continued supply of the crude gas.

9. A method of producing nitrogen-enriched gas with a purity of 95–99.999% from crude gas mainly containing nitrogen and oxygen by alternately repeating pressurized adsorption and atmospheric pressure regeneration with the use of a nitrogen-enriched gas separating apparatus which comprises a plurality of adsorbers packed with carbon molecular sieve, a balance tank, and a product receiver connected to the balance tank via a check valve, the method comprising the steps of:

(a) causing high-purity nitrogen gas in the balance tank to flow, at a predetermined flow rate, to an outlet of a first adsorber which is undergoing regeneration;

(b) establishing communication between the outlet of the first adsorber having finished the regeneration and an outlet of a second adsorber having finished adsorption while opening inlets of both adsorbers, thereby causing a part of relatively high concentration nitrogen gas in the second adsorber to move to the outlet of the first adsorber while also causing said part of nitrogen gas to purge gas in the first adsorber from the inlet thereof; and (c) after performing the above step (b) for a predetermined time, reversely passing a predetermined amount of high-purity nitrogen gas from the balance tank to the outlet of the first adsorber while also supplying the crude gas via the inlet of the first adsorber for pressurization, whereupon the first adsorber is shifted to the adsorption by continued supply of the crude gas.

10. The method according to claim 9, wherein, in the above step (c), the high-purity nitrogen gas is reversely passed at a flow rate so that the pressure in the first adsorber becomes no less than 40% but less than 60% of a maximum gauge pressure exhibited during the adsorption.

11. The method according to claim 9, wherein, in the above step (b), the movement of gas from the second adsorber to the first adsorber is stopped when the ratio in absolute pressure of the first adsorber relative to the second adsorber reaches 0.05–0.95.

12. The method according to claim 9, wherein, in the above step (c), the ratio in flow rate between the reversely passed high-purity gas and the supplied crude gas is 1:2 to 2:1.

13. The method according to claim 9, wherein the adsorber undergoing the adsorption exhibits a maximum pressure of no less than 5 kg/cm$^2$ G.

* * * * *